United States Patent [19]

Rovetta et al.

[11] 4,351,553
[45] Sep. 28, 1982

[54] MULTI-PURPOSE MECHANICAL HAND

[75] Inventors: Alberto Rovetta, Milan; Ilario Franchetti, San Vittore Olona; Pietro Vicentini, Rho, all of Italy

[73] Assignee: Alfa Romeo S.p.A., Milan, Italy

[21] Appl. No.: 186,201

[22] Filed: Sep. 10, 1980

[30] Foreign Application Priority Data

Sep. 19, 1979 [IT] Italy .............................. 25817 A/79

[51] Int. Cl.$^3$ .............................................. A61F 1/06
[52] U.S. Cl. .................................... 294/106; 294/111; 414/7
[58] Field of Search ............. 294/106, 111, 116, 87 R, 294/87 A, 87.22, 99 R, 110 R; 414/5, 7, 732, 735, 738, 739, 1, 744 A

[56] References Cited

U.S. PATENT DOCUMENTS

| | | | |
|---|---|---|---|
| 3,694,021 | 9/1972 | Mullen | 294/106 |
| 3,952,880 | 4/1976 | Hill et al. | 294/106 |
| 4,068,882 | 1/1978 | Van der Schoot | 294/106 |
| 4,259,876 | 4/1981 | Belyanin | 414/7 |

*Primary Examiner*—James B. Marbert
*Attorney, Agent, or Firm*—Charles E. Brown

[57] ABSTRACT

This invention relates to a multi-purpose mechanical hand mainly for industrial applications and able to grip pieces of various shapes and dimensions. The mechanical hand according to the invention is constituted by at least three fingers, each finger being provided with articulated phalanges and a gripping element, the fingers being controlled by a system which enables the degree of tightening and the grip to be controlled by a force threshold method on the basis of the signal representing the force exerted by the individual finger.

7 Claims, 7 Drawing Figures

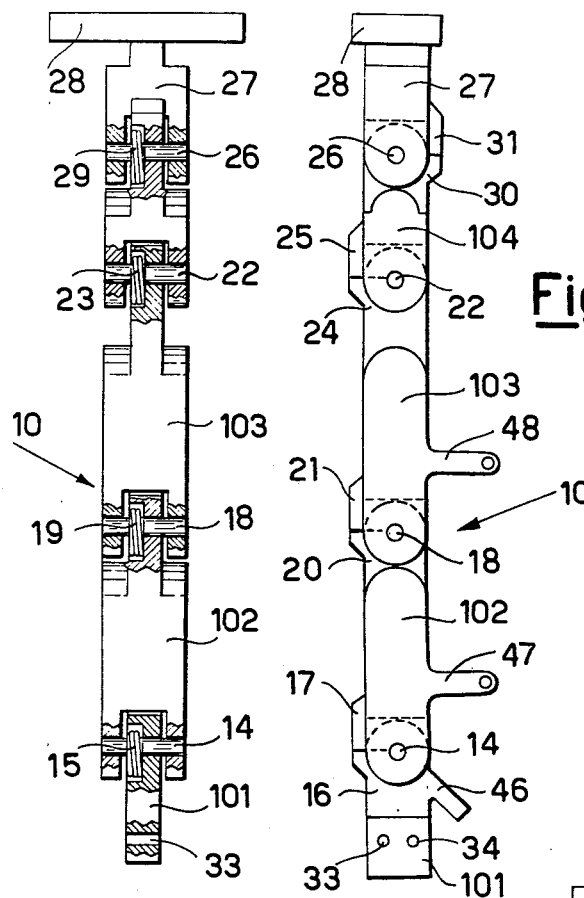
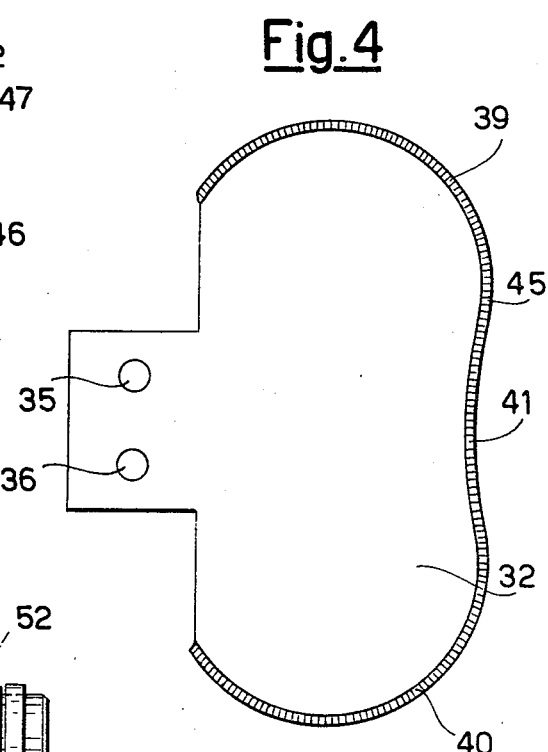
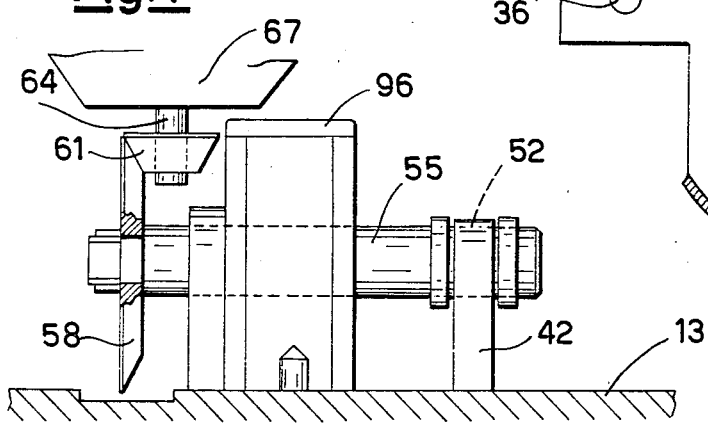

MULTI-PURPOSE MECHANICAL HAND

The purpose of mechanical gripping devices, as in the case of other numerous automation devices, is to carry out relatively simple, repetitive operations. The advantage of such devices is therefore greater the more versatile and effective they are from the point of view of being able to operate with pieces of different dimensions and shapes, and of being able to carry out the various operational stages in times which are suitable for the speed of the industrial process in which they are used.

In view of this, there is a present tendency to develop mechanical gripping devices of the multi-purpose type, because such devices are able to carry out different operational sequences, and can therefore be adapted with a certain ease to different industrial processes.

The gripping of an object by a mechanical device takes place substantially in two stages, the first consisting of the approach and contact between the device and object, and the second consisting of the settling of the gripping device relative to the object, and the gripping thereof.

The gripping operation is then followed by other operations such as the movement of the object, its unloading, machining etc.

Multi-purpose mechanical gripping devices are already known, and of these the most versatile appear to be those which reproduce the morphological configuration and operating process of the human hand.

These devices are constituted by two opposing fingers and a central plate disposed between the two fingers to act as a palm. Each finger is provided with articulated phalanges and a gripping element, which acts as the finger tip. The movements of the phalanges are controlled by reaction springs disposed in the joints of the phalanges, and a traction cable operated by suitable motors, one for closing the fingers, the other for opening the fingers. The springs perform the function of the extending tendons for the fingers of a human hand, and the cable performs the function of the flexing tendons.

The piece to be gripped rests on the gripping elements of the two fingers and on the plate acting as the palm. The three points of contact define the plane in which the reaction forces exerted by the fingers and palm on the piece lie at the moment of gripping. Consequently, a stable grip is obtained which allows correct lifting of the piece when the external forces, for example the weight, have a resultant which lies in said plane and forms with said reaction forces a force system which is balanced against rotation.

Because of their configuration, such devices have a rather limited field of application, in the sense that they can effect a stable grip only on pieces of suitable shape, and when said pieces are suitably arranged relative to the fingers and plate.

The object of the present invention is a mechanical hand able to grip pieces of various shapes, and capable of operating independently of the arrangement of the pieces relative thereto. A mechanical hand is therefore provided comprising fingers and a support element for said fingers, wherein each finger is constituted by a set of links connected to each other by hinge means and by preloaded resilient means arranged to rotate each link relative to the adjacent link in a predetermined direction until it abuts against stop means in order to cause said finger to assume a predetermined rest configuration, the end link of each finger being provided with a gripping element; said mechanical hand also comprising a traction cable for each finger, said cable being fixed to the end link of the finger and being slidably supported by those links of said finger which are able to rotate in a direction which is opposite to the direction of rotation imposed by said resilient means; said mechanical hand also comprising actuator means operationally connected to the finger traction cables, said actuator means being capable of subjecting said cables to traction in order to displace the links of each finger from their rest configuration and to cause them to rotate in the direction opposite to the direction of rotation imposed by said resilient means, so causing the gripping element of each finger to rest on the piece to be gripped, said actuator means being also capable of locking said cables when under traction in order to keep the links of each finger in their working configuration with the piece gripped by the gripping elements of the fingers, said actuator means being finally able to nullify the traction force on said cables in order to enable the links of each finger to return to their rest position under the action of said resilient means, for each finger there being provided a sensor for sensing the traction force to which the relative cable is subjected, said mechanical hand also comprising control means for said actuator means consisting of threshold comparator means operationally connected to said sensors, said threshold comparator means causing the actuator means to lock said cables under traction when a predetermined value of the traction force is attained.

According to a preferred embodiment, said mechanical hand comprises at least three fingers, the traction cable of each finger being operationally connected to a respective actuator, each actuator being caused by a respective threshold comparator to lock the cable of the relative finger when a predetermined value of the relative traction force is attained.

Characteristics and advantages of the invention will be more apparent from the accompanying FIGS. 1 to 7, which show a preferred embodiment of the example by way of non-limiting example, and in which:

FIG. 2 is a partly sectional front view of a finger of the hand of FIG. 1;

FIG. 3 is a side view of the finger of FIG. 2;

FIG. 4 is a side view of the gripping element of a finger of the mechanical hand;

FIG. 7 is a partial view of the transmission forming part of one of the actuators of FIG. 5.

Figure 1:
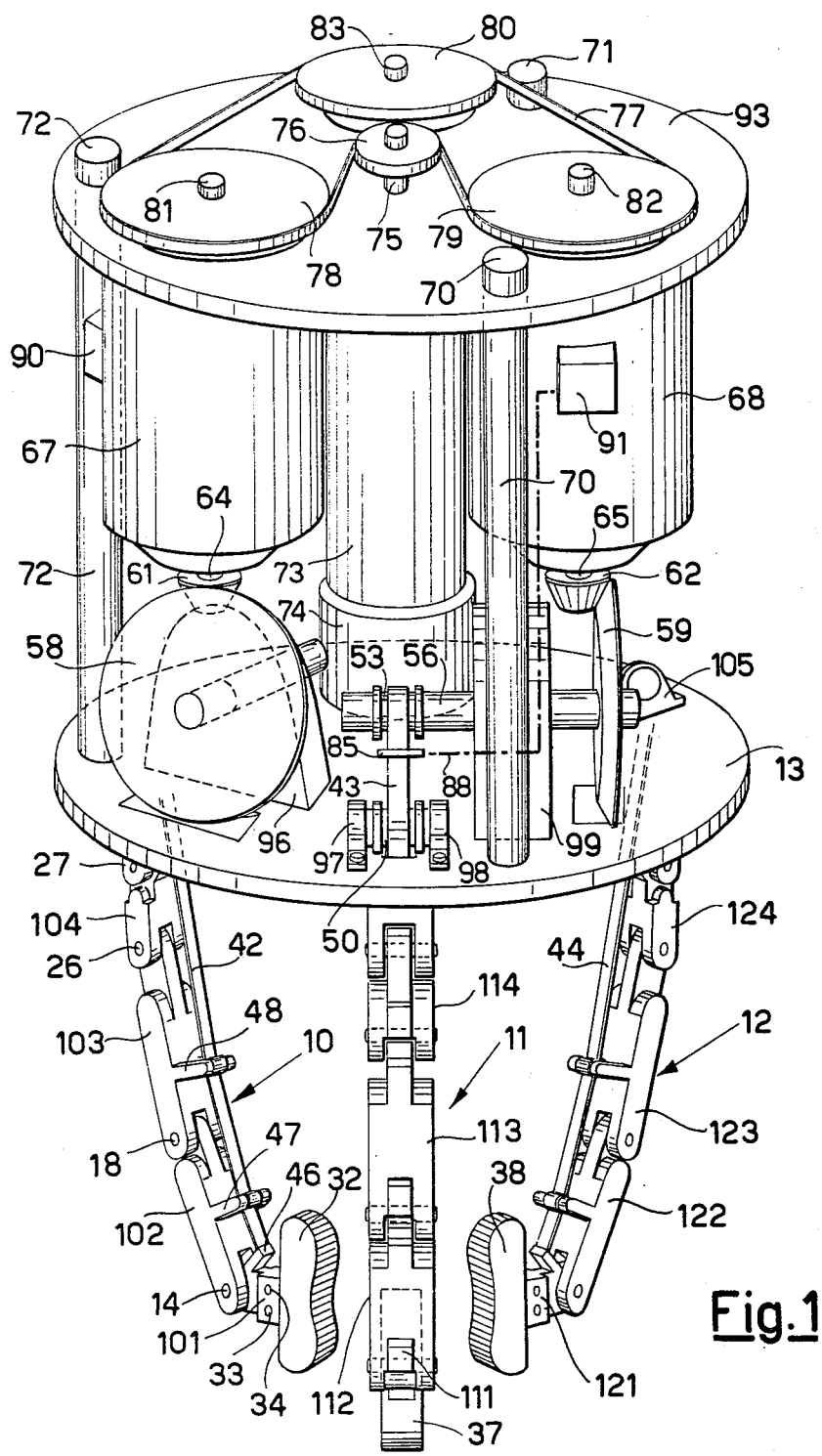
FIG. 1 is a perspective view of the mechanical hand according to the invention.

In FIG. 1 the three fingers of the mechanical hand supported by the plate 13 are indicated overall by 10, 11 and 12. Each finger is constituted by four jointed links which perform the function of the phalanges of the fingers of a human hand. The links of the finger 10 are indicated by 101, 102, 103, 104. Those of the finger 11 are indicated by 111, 112, 113, 114, and those of the finger 12 are indicated by 121, 122, 123, 124. The constitution of the fingers is more clearly visible in FIGS. 2 and 3, in which the finger 10 is shown in detail.

The end link 101 is pivoted at 14 to the central link 102, and concentrically to the pin 14 there is disposed a preloaded spiral spring 15 having one end right with the link 101 and its other end rigid with the link 102. The link 101 is provided with an external projection 16 which engages with a corresponding projection 17 on the link 102. Two said projections act as a limit stop for the clockwise rotation (in the case of FIG. 3) of the link 101 relative to the link 102.

The link 102 is pivoted at 18 to the inner link 103, and concentrically to the pin 18 there is disposed a preloaded spiral spring 19 having one end rigid with the link 102 and its other end rigid with the link 103. The link 102 is provided with an external projection 20 which engages with a corresponding projection 21 on the link 103. The two said links act as a limit stop for the clockwise rotation of the link 102 relative to the link 103. The link 103 is pivoted at 22 to the most inner link 104, and concentrically to the pin 22 there is disposed a preloaded spiral spring 23 having one end rigid with the link 103 and its other end rigid with the link 104. The link 103 is provided with an external projection 24 which engages with a corresponding projection 25 on the link 104. The two said projections act as a limit stop for the clockwise rotation of the link 103 relative to the link 104. The link 104 is pivoted in its turn at 26 to a stirrup 27 forming a single body with the flange 28, which is fixed to the plate 13 shown in FIG. 1.

Concentrically to the pin 26 there is disposed a preloaded spiral spring 29 having one end rigid with the link 104 and its other end rigid with the stirrup 27.

The link 104 is provided with a further external projection 30, which engages with a corresponding external projection 31 on the stirrup 27. The two said projections act as a limit stop for the clockwise rotation (in the case of FIG. 3) of the link 104 relative to the stirrup 27.

The spiral springs 15, 19, 23 and 29 perform the function of the extending tendons of the finger of a human hand. The springs 15, 19 and 23 exert on the respective links a return action directed in a clockwise direction (in FIG. 3), while the spring 29 exerts on the link 104 a return action directed in the anticlockwise direction (again in FIG. 3). The counter-joint constituted by the pin 26 and spring 29 enables a hyperextension of the link 104 to be obtained in the opposite direction to that in which the links 101, 102 and 103 are free to rotate, as happens in the case of the next phalanx of the fingers of a human hand.

The spiral springs 15, 19, 23 can have different characteristics, with a rigidity which increases passing from the first to the third spring, in order to obtain rapidity in the gripping operation and robustness of the fingers by virtue of the different reactions.

For the same reasons, the preloading of the springs can also be different, and in particular the preload can increase passing from the first to the third spring. Said springs could also be of different type (leaf, rubber etc.).

Each finger is provided with a gripping element which performs the function of a finger tip of a human hand. As shown in FIG. 1, the gripping element 32 of the finger 10 is rigid with its end link 101, for which purpose the link 101 is provided with through bores 33 and 34 (visible in FIGS. 2 and 3) in which are inserted the connection elements which engage with the corresponding bores 35 and 36 (visible in FIG. 4) of the gripping element 32. The gripping element 37 of the finger 11 is rigid with its end link 111, and the gripping element 38 of the finger 12 is rigid with its end link 121.

The gripping element, shown enlarged in FIG. 4, has a polycentric profile constituted by two circular arcs 39 and 40 connected by a third circular arc 41.

The gripping element is covered with a covering 45 of suitable material having characteristics which ensure a suitable coefficient of friction for its surface.

The particular configuration of the gripping elements has enabled a self-centering system to be obtained, in the sense that during the gripping of the piece, the gripping elements of the three fingers tend to make the piece assume the position in which the external forces acting on the piece (such as the weight) are balanced by the reactions at the points of contact with said gripping elements. The configuration of the gripping elements and the covering of suitable material ensure a stable grip.

Each finger is provided with a traction cable which performs the function of the flexing tendons of the fingers of a human hand. The traction cable 42 for the finger 10 is fixed to its end link 101 at the appendix 46, visible in FIG. 3. Said cable 42 is slidably supported by the central link 102 of said finger 10 at the appendix 47, and is also slidably supported by the inner link 103 at the appendix 48.

Likewise, the traction cable 43 for the finger 11 is fixed to its end link 111, and is slidably supported by its central link 112 and by its inner link 113. The traction cable 44 for the finger 12 is also fixed to its end link 121, and is slidably supported by its central link 122 and its inner link 123.

Figure 5:
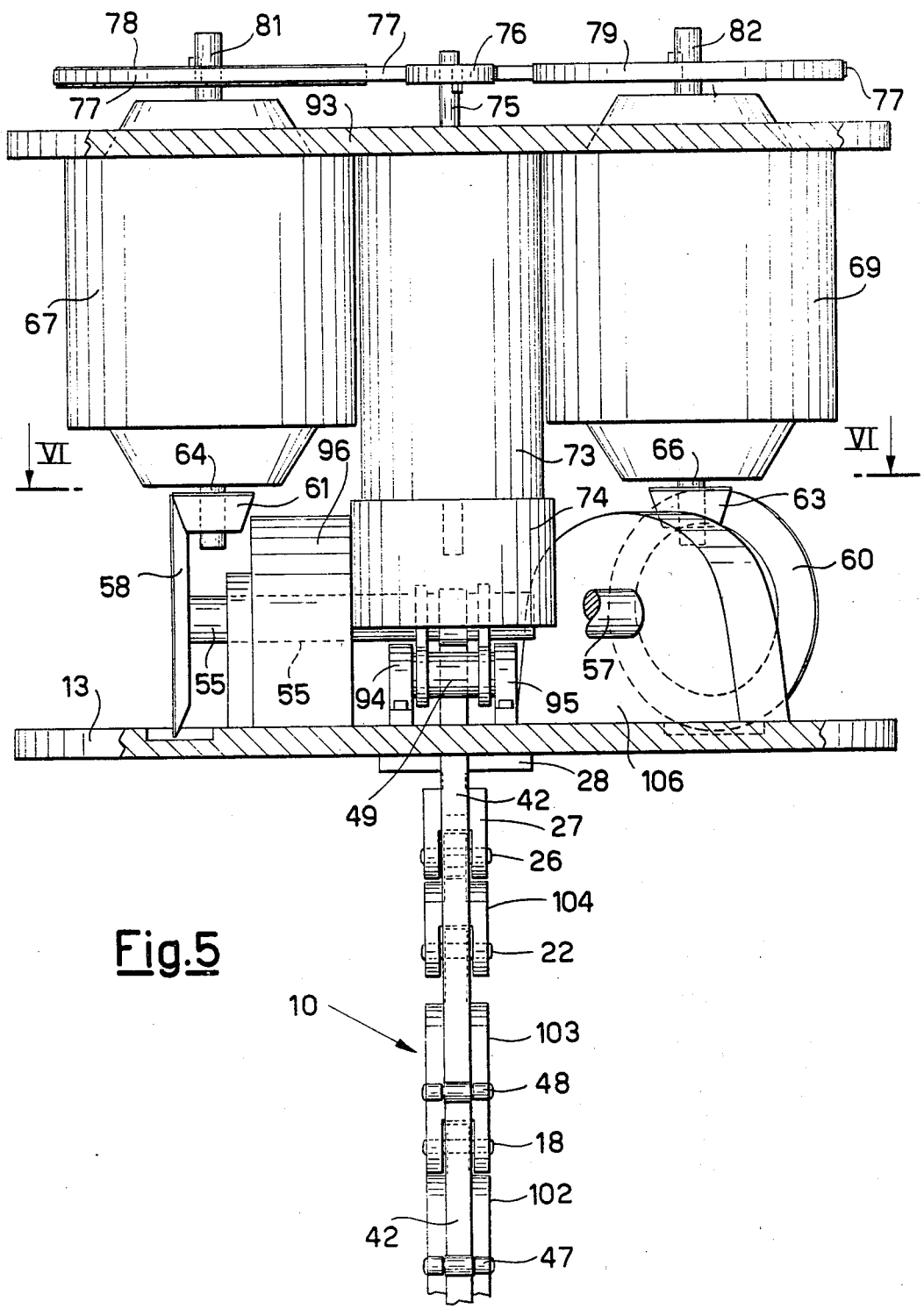
FIG. 5 is a partial front view of the system of actuators for the fingers of the mechanical hand of FIG. 1.
Figure 6:
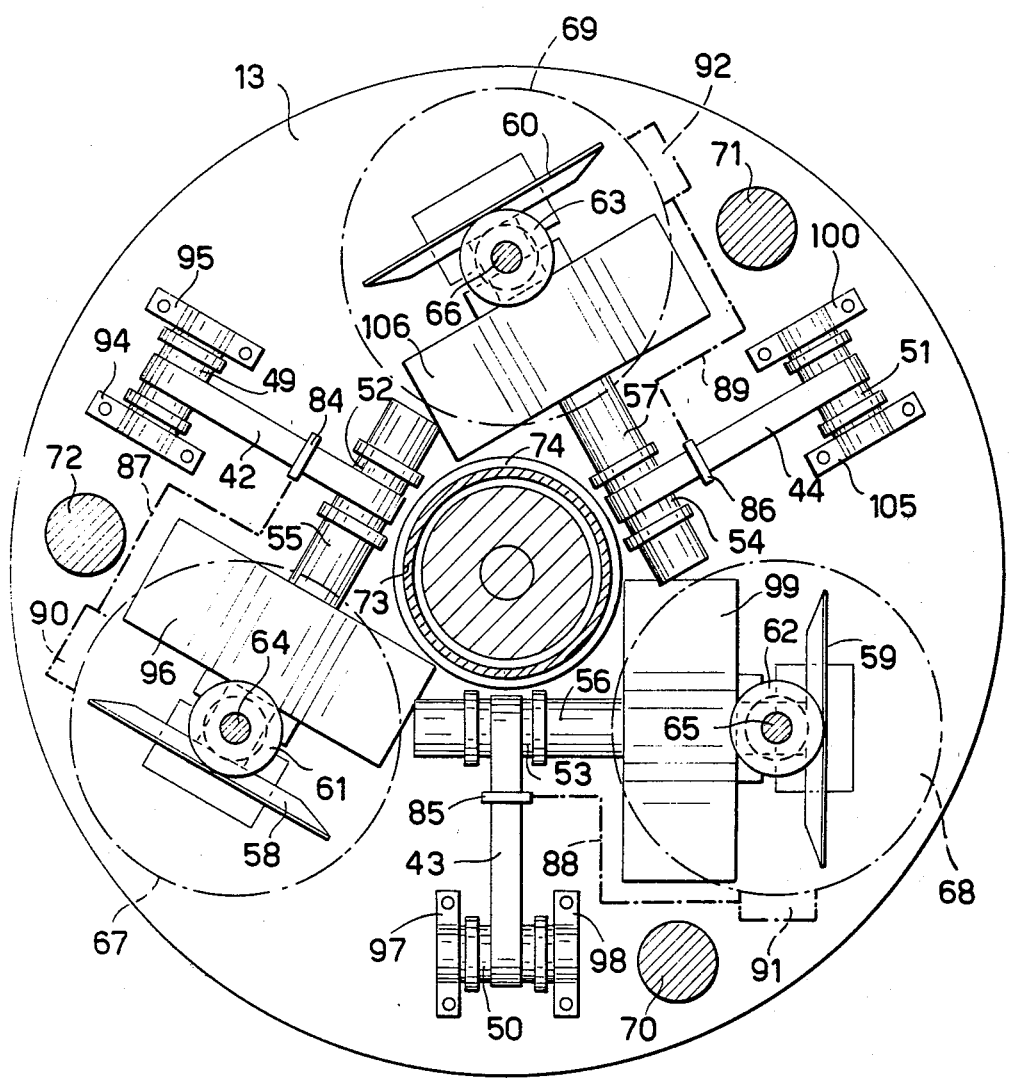
FIG. 6 is a section through the finger actuator system on the line VI—VI of FIG. 5.

The traction cables 42, 43 and 44 which emerge from suitable passages in the plate 13 are slidably supported by deviation pulleys indicated by 49, 50, 51, and are connected to respective drive pulleys indicated by 52, 53, 54 clearly visible in FIG. 6. The drive pulleys 52, 53, 54 are rigid with respective shafts 55, 56, 57, on which respective bevel gears 58, 59 and 60 are keyed, to engage with respective bevel pinions 61, 62, 63 (see the transmission for the cable 42 in FIG. 7). The bevel pinions 61, 62 and 63 are keyed on to the exit shafts 64, 65 and 66 of the electrical clutch-brake units 67, 68, 69, which are not shown in detail because they are of known type (see FIGS. 5, 6 and 7 in addition to FIG. 1).

The clutch-brake units are fixed to the plate 93, which itself is connected to the plate 13 by uprights 70, 71 and 72. A normal electric motor indicated by 73 and fitted with a respective brake 74 is also fixed to the plate 93.

A pinion 76 is keyed on to the exit shaft 75 of the electric motor 73, and by means of the chain 77 drives the toothed pulleys 78, 79, 80 keyed on to the inlet shafts 81, 82, 83 of the clutch-brake units 67, 68, 69.

The traction cables 42, 43, 44 are provided with sensors for sensing the traction force exerted on them. The sensors, indicated respectively by 84, 85, 86 are visible in FIG. 6. Said sensors are connected by the conductors 87, 88, 89 to the threshold comparators 90, 91 and 92 shown in FIGS. 1 and 6, which control the operation of the brake of the respective clutch-brake unit 67, 68, 69.

The supports for the deviation pulley 49 are indicated by 94 and 95, and the support for the shaft 55 is indicated by 96. The supports for the deviation pulley 50 are indicated by 97 and 98, and the support for the shaft 56 is indicated by 99. Finally, the supports for the deviation pulley 51 are indicated by 100 and 105, and the support for the shaft 52 is indicated by 106.

When a piece is presented to the fingers of the mechanical hand in order to be gripped, the electric motor 73 is operated, and its shaft 75 drives, by way of the pinion 76 and chain 77, the toothed pulleys 78, 79, 80 and the inlet shafts 81, 82, 83 of the clutch-brake units 67, 68, 69. The exit shafts 64, 65 and 66 of said units are rotated by way of their clutches, and the shafts 55, 56, 57 of the drive pulleys 52, 53, 54 for the traction cables 42, 43, 44 are rotated by way of the bevel gear pairs 61–58, 62–59 and 63–60.

As the cables wind around their pulleys, they exert a traction action on the links of the fingers 10, 11, 12 against the action of the spiral springs 15, 19 and 23 of the link joints. The links become displaced from their rest configuration, rotating towards the interior of the mechanical hand so as to bring the gripping elements 32, 37 and 38 into contact with the piece to be gripped. As the traction action exerted by the cables increases, the support reactions exerted by the gripping elements on the piece increase until these reactions balance the external forces, such as the weight, acting on the piece.

Beyond a certain value of traction force, in relationship to the rigidity of the spiral springs, the most inner links 104, 114 and 124 of the three fingers are able to rotate in the opposite direction to that in which the other links 101, 102, 103, 111, 112, 113 and 121, 122 and 123 are rotated. The traction force exerted by the individual cables is measured by the relative threshold comparator by way of the relative sensor, and when the support reaction of the individual gripping element, and thus the traction force of the relative cable, reaches the set threshold value, the threshold comparator causes the brake of the clutch-brake unit to operate, so stopping the cable and locking the relative finger in the working configuration which ensures stable support for the piece.

When all three fingers are locked in their working configuration, the electric motor 73 is locked by the respective brake 74. The force threshold which locks the finger in its working configuration can have the same value for all three fingers, but it is preferably of a different value for each finger, in order to give the mechanical hand a greater flexibility of application with pieces of different shapes and arrangements.

When the piece is to be discharged by the hand, the brakes of the three clutch-brake units are released, and by means of the relative clutches the electric motor, by rotating in the opposite direction, causes the cables to unwind from their pulleys, and the links of the three fingers return to their rest configuration under the return action of the spiral springs at their joints.

We claim:

1. A mechanical hand suitable for gripping pieces, said mechanical hand comprising fingers and a support element for said fingers, each finger being constituted by a set of links connected to each other by hinge means and by preloaded resilient means separately arranged to rotate each link relative to the adjacent link in a predetermined direction until it abuts against stop means in order to cause said finger to assume a predetermined rest configuration, the most outer link of each finger being provided with a gripping element, said gripping element generally opposing one another for gripping an element from opposite directions towards a general center, said mechanical hand also comprising a traction cable for each finger, said cable being fixed to the end link of the finger and being slidably supported by those links of said finger which are able to rotate in a direction which is opposite the direction of rotation imposed by said preloaded resilient means; said mechanical hand also comprising actuator means operationally connected to the finger traction cables, said actuator means being capable of subjecting said cables to traction in order to displace the links of each finger from their rest configuration and to cause them to rotate in the direction opposite to the direction of rotation imposed by said resilient means, so causing the gripping element of each finger to rest on the piece to be gripped, said actuator means being also capable of locking said cables when under traction in order to keep the links of each finger in their working configuration with the piece gripped by the gripping elements of the fingers, said actuator means being finally able to nullify the traction force on said cables in order to enable the links of each finger to return to their rest position under the action of said preloaded resilient means, for each finger there being provided a sensor for sensing the traction force to which the relative cable is subjected, said mechanical hand also comprising control means for said actuator means including threshold comparator means operationally connected to said sensors, said threshold comparator means causing the actuator means to lock said cables under traction when a predetermined value of the traction force is attained.

2. A mechanical hand as claimed in claim 1, comprising at least three fingers, the traction cable of each finger being operationally connected to a respective actuator, each actuator being caused by a respective threshold comparator to lock the cable of the relative finger when a predetermined value of the relative traction force is attained.

3. A mechanical hand as claimed in claim 2, wherein the actuator of each finger is constituted by a drive pulley for said cable and a clutch-brake member operationally connected to said pulley and to a drive motor.

4. A mechanical hand as claimed in claim 1, wherein each finger is constituted by four links pivoted to each other, the fourth link, which is the most inner link, being pivoted to said support element for pivoting about a pivot axis disposed parallel to the general plane of said support element, each finger being provided with three preloaded spiral springs each of which is disposed at a pin forming part of each of said hinge means and is rigidly connected to one link and to the adjacent link; said spiral springs being capbale of rotating each link relative to the adjacent link in a predetermined direction until it abuts against said stop means; each finger being provided with a fourth preloaded spiral spring disposed at the pin which connects said fourth link to the support element, and rigidly connected to said fourth link and to the support element in such a manner as to rotate said fourth link in the opposite direction to said predetermined direction until it abuts against its stop means.

5. A mechanical hand suitable for gripping pieces, comprising fingers and a support element for said fingers, each finger being constituted by a set of links connected to each other by hinge means and by preloaded resilient means arranged to rotate each link relative to the adjacent link in a predetermined direction until it abuts against stop means in order to cause said finger to assume a predetermined rest configuration, the most outer link of each finger being provided with a gripping element, said gripping element generally opposing one another for gripping an element from opposite directions towards a general center, said mechanical hand also comprising a traction cable for each finger, said cable being fixed to the end link of the finger and being slidably supported by those links of said finger which are able to rotate in a direction which is opposite the direction of rotation imposed by said preloaded resilient means; said mechanical hand also comprising actuator means operationally connected to the finger traction cables, said actuator means being capable of subjecting said cables to traction in order to displace the links of each finger from their rest configuration and to cause them to rotate in the direction opposite to the direction of rotation imposed by said resilient means, so causing the gripping element of each finger to rest on the piece to be gripped, said actuator means being also capable of locking said cables when under traction in order to keep the links of each finger in their working configuration with the piece gripped by the gripping elements of the fingers, said actuator means being finally able to nullify the traction force on said cables in order to enable the links of each finger to return to their rest position under the action of said preloaded resilient means, for each finger there being provided a sensor for sensing the traction force to which the relative cable is subjected, said mechanical hand also comprising control means for said actuator means including threshold comparator means operationally connected to said sensors, said threshold comparator means causing the actuator means to lock said cables under traction when a predetermined value of the traction force is attained, each finger being constituted by four links pivoted to each other, the fourth link, which is the most inner link, being pivoted to said support element, each finger being provided with three preloaded spiral springs each of which is disposed at a pin forming part of each of said hinge means and is rigidly connected to one link and to the adjacent link; said spiral springs being capable of rotating each link relative to the adjacent link in a predetermined direction until it abuts against said stop means; each finger being provided with a fourth preloaded spiral spring disposed at the pin which connects said fourth link to the support element, and rigidly connected to said fourth link and to the support element in such a manner as to rotate said fourth link in the opposite direction to said predetermined direction until it abuts against its stop means, said spiral springs being of different rigidity, the rigidity increasing on passing from the spring engaged with the end link to the spring engaged with the inner link, the preloads of said springs also being different, the preload increasing on passing from the spring engaged with the end link to the spring engaged with the inner link.

6. A mechanical hand suitable for gripping pieces, comprising fingers and a support element for said fingers, each finger being constituted by a set of links connected to each other by hinge means and by preloaded resilient means arranged to rotate each link relative to the adjacent link in a predetermined direction until it abuts against stop means in order to cause said finger to assume a predetermined rest configuration, the most outer link of each finger being provided with a gripping element, said gripping element generally opposing one another for gripping an element from opposite directions towards a general center, said mechanical hand also comprising a traction cable for each finger, said cable being fixed to the end link of the finger and being slidably supported by those links of said finger which are able to rotate in a direction which is opposite the direction of rotation imposed by said preloaded resilient means; said mechanical hand also comprising actuator means operationally connected to the finger traction cables, said actuator means being capable of subjecting said cables to traction in order to displace the links of each finger from their rest configuration and to cause them to rotate in the direction opposite to the direction of rotation imposed by said resilient means, so causing the gripping element of each finger to rest on the piece to be gripped, said actuator means being also capable of locking said cables when under traction in order to keep the links of each finger in their working configuration with the piece gripped by the gripping elements of the fingers, said actuator means being finally able to nullify the traction force on said cables in order to enable the links of each finger to return to their rest position under the action of said preloaded resilient means, for each finger there being provided a sensor for sensing the traction force to which the relative cable is subjected, said mechanical hand also comprising control means for said actuator means including threshold comparator means operationally connected to said sensors, said threshold comparator means causing the actuator means to lock said cables under traction when a predetermined value of the traction force is attained, said gripping element having a polycentric profile constituted by two circular arcs with their convexity facing towards the outside of the gripping element, said two circular arcs being connected by a third circular arc with its convexity facing towards the inside of said gripping element.

7. A mechanical hand as claimed in claim 6, wherein said gripping element is provided with a covering of suitable material having a prechosen coefficient of friction and a prechosen degree of elasticity.

* * * * *